INVENTOR.
MICHAEL COOPERMAN
BY L. A. Lerner
ATTORNEY

Oct. 27, 1964 M. COOPERMAN 3,154,720

SOLID STATE DISPLAY DEVICE

Filed April 29, 1960 3 Sheets-Sheet 2

INVENTOR.
MICHAEL COOPERMAN
BY L. A. Larsen
ATTORNEY

INVENTOR.
MICHAEL COOPERMAN
BY
L. A. Lane
ATTORNEY

United States Patent Office 3,154,720
Patented Oct. 27, 1964

3,154,720

SOLID STATE DISPLAY DEVICE

Michael Cooperman, Haddonfield, N.J., assignor to Radio Corporation of America, a corporation of Delaware Filed Apr. 29, 1960, Ser. No. 25,748
16 Claims. (Cl. 315—169)

This invention relates to solid state display devices. In particular, this invention relates to a means for scanning a solid state display device so that the desired information may be produced at the desired location or area.

In conventional vacuum tube display devices, horizontal and vertical scanning is provided by means of magnetic or electrostatic deflection of an electron beam over a cathodoluminescent phosphor. As is well known, this type of display device requires a rather large volume and weight for a given display area. In contrast to the cathode ray type display device, solid state lighting devices are known which are relatively thin and relatively light in weight. These solid state devices include electroluminescent panels wherein an electroluminescent phosphor is sandwiched between two electrical conductors. When the appropriate potential difference is applied across these two conductors, light is produced by the electroluminescent phosphor. When it is desired to incorporate signal information in the light produced, the conductors are usually divided into appropriate signal areas so that they can be selected at random or, in the alternative, a cross grid array of conductors is utilized. The cross grid array comprises a first plurality of fine conductors on one side of the electroluminescent phosphor and extending in one direction, and a second plurality of fine conductors extending normal to said one direction and on the other side of the electroluminescent phosphor. By applying a potential to a selected horizontal or vertical conductor, a spot of light is produced. By selecting appropriate spots, an image is produced.

In the known solid state display devices, the means for scanning, or for distributing the signal information to each conductor or signal area, have been complex and power consuming and have generally been unsuitable for the known mass production techniques. As an example, when using the cross grid array type of display panel, a separate wire must be connected to each of the horizontal and vertical extending wires in order to apply the desired horizontal and vertical scanning signals. The known mechanisms of commutating the display information to each wire, are complex in structure, power consuming and generally unsuitable for the known mass production techniques.

It is therefore an object of this invention to provide an improved display device.

It is a further object of this invention to provide an improved display device having a novel scanning means.

These and other objects are accomplished in accordance with this invention by providing an electroluminescent display device which includes a scanning means comprising a ferro-electric member and a means for providing a distributed bias to the ferro-electric member. By means of the novel scanning system, the selected areas of the electroluminescent display device may be selectively energized.

The invention will be more clearly understood by reference to the accompanying three sheets of drawings wherein.

Figure 1:
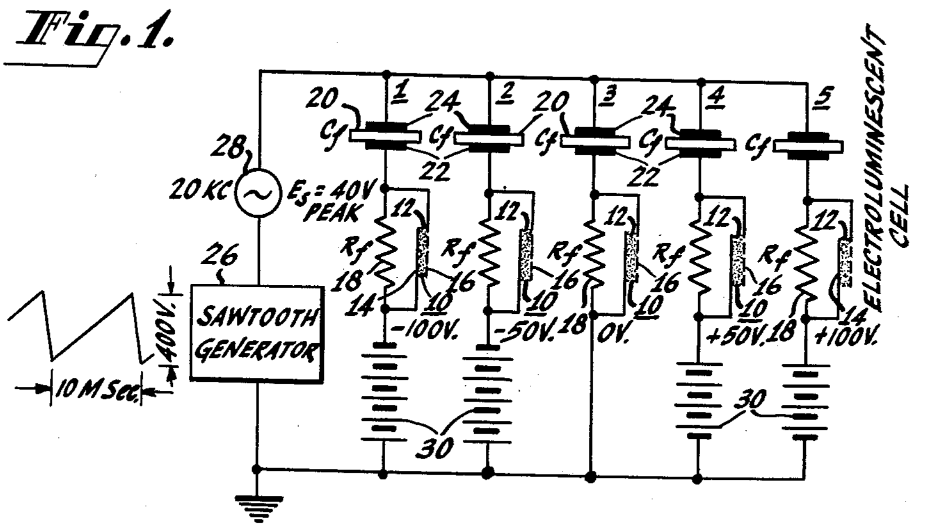
FIG. 1 is a circuit schematically illustrating a five element scanning line in accordance with this invention.

Referring now to FIG. 1, there is shown a circuit diagram of a device in accordance with this invention and having a five element scanning line. The circuit includes a plurality of electroluminescent cells 10. Each of these cells 10 comprises an electroluminescent phosphor 12 sandwiched between two electrical conductors 14 and 16, at least one of which is light transparent. The electroluminescent phosphor may be a material such as zinc sulfide or zinc sulfo-selenide embedded in a suitable plastic such as, for example, an epoxy resin. The conductor 14 may be any electrical conductor such as copper, while the transparent conductor 16 may be any transparent electrically conducting material such as tin oxide or thin evaporated gold. The electroluminescent devices 10 may be supported on a transparent support member, not shown, such as glass if desired.

Connected in parallel with each of the electroluminescent areas 10 is a different one of a plurality of by-pass resistors 18 each having a resistance $R_f$. The values of the by-pass resistors are a function of the reactance of ferro-electric capacitors to be described. For the circuit shown in FIG. 1, where $C_f$ was, in a particular example, about 500 $\mu\mu$f. during conduction, the value of $R_f$ was about 35K ohm. The by-pass resistors may be separate elements as shown, or the inherent D.C. resistance of the phosphor material 12 may function as the resistor 18.

Connected in series with each parallel combination of a resistor 18 and an electroluminescent cell 10 is one of a plurality of ferro-electric devices 20. Each of the ferro-electric devices 20 comprises a ferro-electric or non-linear dielectric member, which may be made of a material such such as barium titanate, barium-strontium titanate, barium stannate, sodium columbate, sodium tantalate, potassium columbate and potassium tantalate. The ferro-electric member may be approximately .01 inch thick. On each side of each of the ferro-electric members 20 there is an electrically conductive member 22 and 24 respectively. The conductive members 24 are connected together and are connected to a sawtooth generator 26 through a signal generator 28. The frequency of the signal generated by the sawtooth generator 26 is such that the time of one complete sawtooth cycle is the same as the line scanning time. The magnitude of the pulse produced by the sawtooth generator 26 is such that, with a signal applied from source 28, a selected one of the ferro-electric members 20 is in a low impedance condition. The signal applied from source 28 is of a magnitude such that the selected one of the electroluminescent cells 10 will produce light in proportion to the magnitude of the signal. The signal generator 28 is amplitude modulated and operates at a frequency that is relatively high, for example approximately 20 kilocycles or greater. The other side of each of the parallel combinations of a resistor 18 and an electroluminescent cell 10 is connected to ground by being connected through different bias sources. The bias sources in this embodiment are illustrated as batteries 30.

Figure 2:
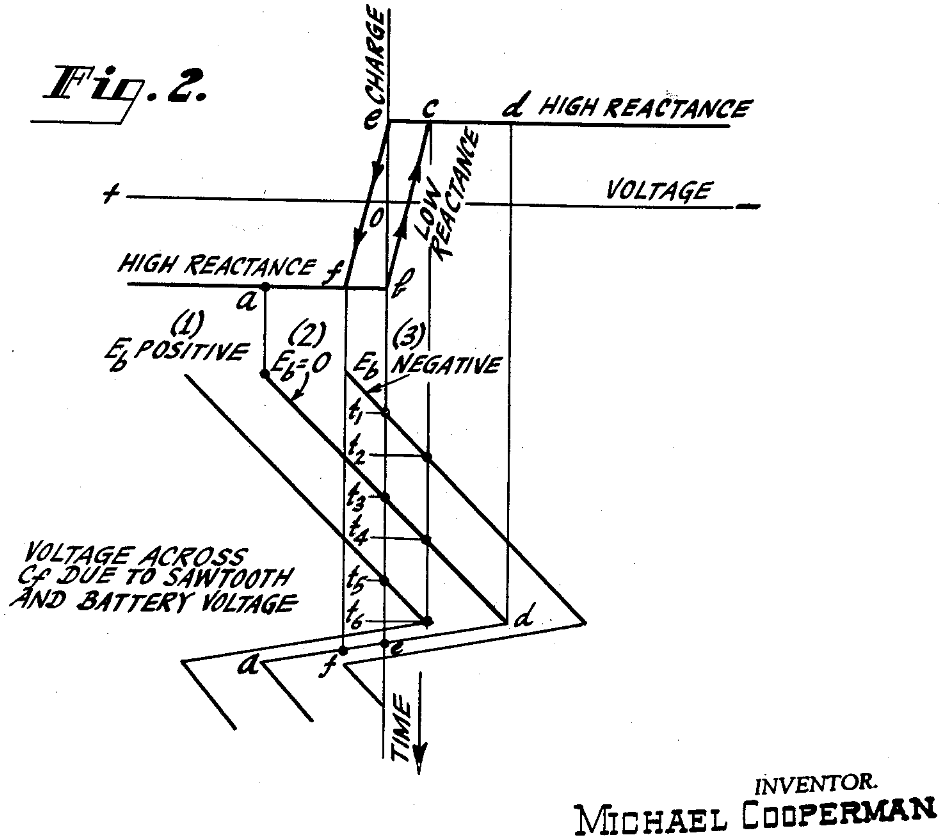
FIG. 2 is a graphical representation of the sequential switching of the elements shown in the circuit of FIG. 1.

Referring now to FIGS. 1 and 2 for an explanation of the operation of the circuit illustrated in FIG. 1, the characteristic of one of the ferro-electric devices or capacitors 20 ($C_f$) is shown in the upper part of FIG. 2 by plotting the capacitor charge against the applied voltage.

This produces a hysteresis loop as shown, which is similar in shape to that observed in magnetic materials. The hysteresis loop has been idealized in order to simplify the analysis of the switching operation in accordance with this invention. The capacitance of the ferro-electric capacitor 20 and the magnitude of the by-pass resistor 18 are proportioned that the sawtooth generator produces a negligible drop across the by-pass resistor 18. Thus, most of the sawtooth voltage appears across the ferro electric capacitor 20. The voltage drop across the ferro-electric capacitor 20, produced by the sawtooth voltage and by the bias source 30 is shown in the lower part of FIG. 2. As the sawtooth voltage goes through a single cycle, the hysteresis loop of FIG. 2 is traversed in the order *a, b, c, d, e, f, a*. As the hysteresis loop is traversed, the reactance of the ferro-electric capacitor 20 is changed so that this reactance is relatively high in the regions *a* to *b*, and *e* to *d*, and relatively low in the region *b* to *c*. It is desirable that the ratio of high to low reactance of the ferro-electric material be made as high as possible. Ratios of about 100 to 1 have been used. With the frequence of the signal input generator 28 selected so as to be high compared to the sawtooth voltage frequency, and its harmonics, the signal from the generator 28 appears across the by-pass resistor 18 only during the time $t_3$ to time $t_4$ of FIG. 2 corresponding to the interval *b–c* of FIG. 2, i.e. only when the reactance of the ferro-electric capacitor 20 is low. It is assumed in this analysis that the amplitude of the signal that is produced by the generator 28 is relatively small and thus the generated signal swings over only a small portion of the characteristic of FIG. 2.

If the bias sources 30 are proportioned, as shown in FIG. 1, the sawtooth voltage is shifted to the right ($E_b$ negative) as shown in FIG. 2. This causes the ferro-electric capacitor 20 to become conductive earlier, namely from time $t_1$ to time $t_2$. If the bias source 30 is more ($E_b$ positive), also as shown in FIG. 1, the sawtooth voltage is shifted to the left as shown in FIG. 2. This causes the ferro-electric capacitors 20 to become conductive later, i.e. from time $t_5$ to $t_6$. Thus, the time of conduction of the ferro-electric capacitor 20, relative to the height of the sawtooth voltage time pulse, is a function of the bias applied by sources 30.

In the circuit shown in FIG. 1, the ferro-electric capacitors 20 conduct in the sequence of the indicated numbers 1 to 5. When the ferro-electric capacitors 20 become conductive, the signal voltage from generator 28 is applied across the corresponding electroluminescent cell 10. With the bias sources 30 selected for the magnitudes shown, the signal voltage is applied to the electroluminescent cells 10 sequentially and provides a five element scanning line. When the signal from the generator 28 is amplitude modulated with information, the brightness produced by the selected electroluminescent cells 10 is proportional to the amplitude of the signal being generated at the instant of conduction. Thus, the information with which the signal from the generator 28 is modulated is displayed as the line is scanned. To rescan the same line, another sawtooth pulse is fed into this line and the input signal is again modulated, in syncronization with the selected height of the sawtooth pulse to provide a scanned line having the desired information.

In the circuit illustrated in FIG. 1, only five elements are shown. It should be understood that any number of elements can be used and five elements are shown merely for simplicity of illustration. It should also be understood that the electroluminescent cells 10 may comprise portions of a picture reproducing device and thus, the area shown would constitute one horizontal line of a complete frame of information. A multiplicity of such areas would provide the various other horizontal lines to produce a complete picture. Still further, it should be understood that the electroluminescent areas 10 may be designed to provide other types of display, such as random access displays, or numeric display, with the proper information or number selected by on-off modulation of the signal at the desired time or height of the sawtooth input pulse.

Figure 3:
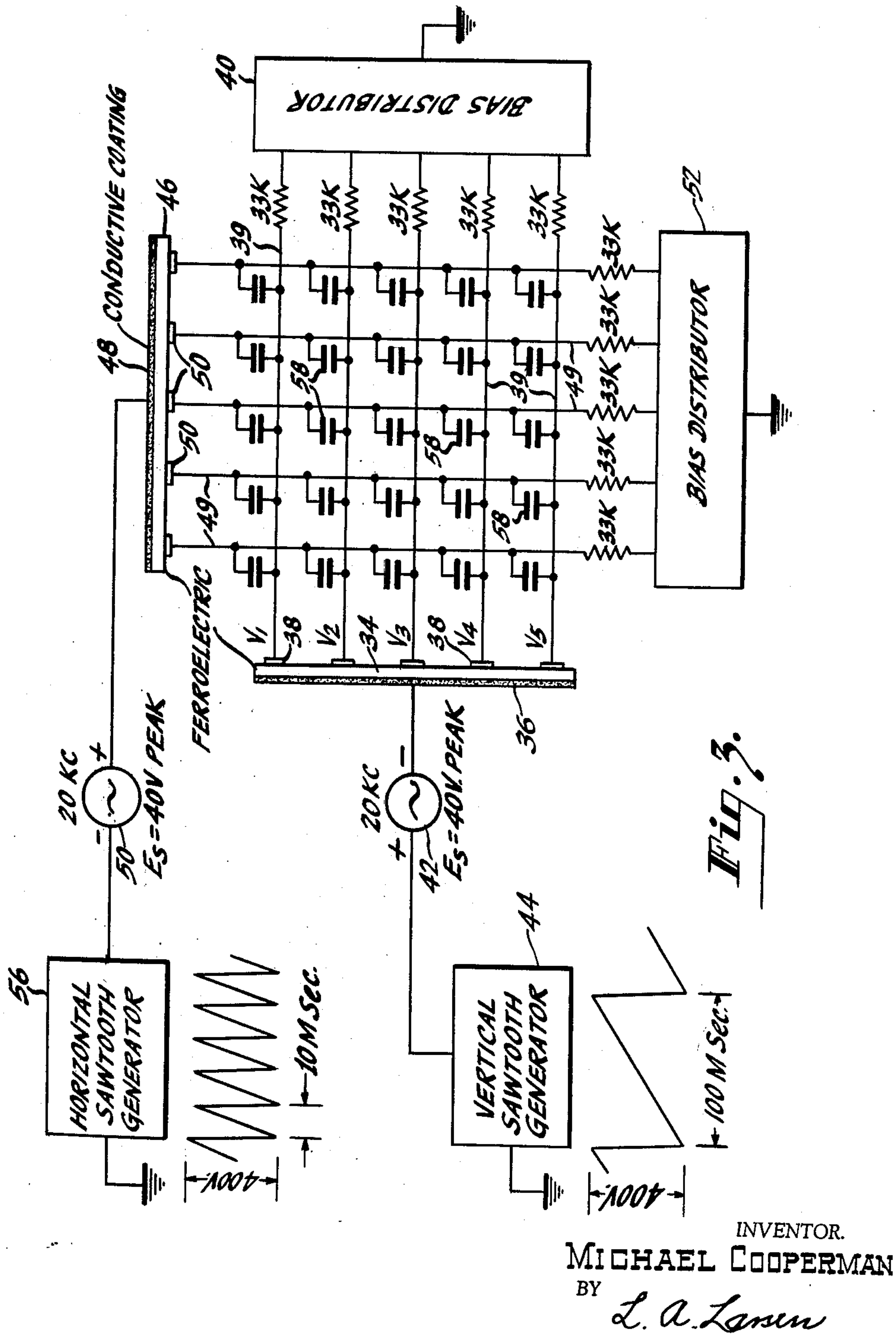
FIG. 3 is a partially schematic view of an embodiment of this invention involving both horizontal and vertical scanning of an electroluminescent device.

Referring now to FIG. 3 there is shown an embodiment of this invention which includes both horizontal and vertical scanning of an electroluminescent device. Specifically, there is provided a ferro-electric layer 34 which is sandwiched between a continuous electrical conductor 36 and a plurality of spaced conductors 38 for the vertical scanning system. Connected to each of the conductors 38 is one of a plurality of wire electrodes 39, each of which is connected to a different bias voltage by means of a bias distributor system 40. Connected to the electrode 36 is a source of signal voltage 42 and a vertical sawtooth generator 44.

The horizontal scanning system is similar to the vertical scanning system, in that it includes a ferro-electric member 46 which is sandwiched between a continuous electrode 48 and a plurality of spaced electrodes 50. Each of the electrodes 50 is connected to a different one of a plurality of wires 49 which extend in a direction normal to that of the wire electrodes 39. The electrodes 49 are also connected to a bias voltage distributor system 52. The system 52 may be similar to that shown in FIG. 1. The electrode 48 is connected to a signal source 50 and to a horizontal sawtooth generator 56.

Connected between each of the vertically scanned wires 39, which extend in a horizontal direction, and the horizontally scanned wires 49, which extend in a vertical direction, are electroluminescent elements 58. The electroluminescent elements 58 may be separate elements as shown in FIG. 3 similar to electroluminescent cells 10 of FIG. 1 or they may be random access areas on which are displayed displays such as numeric or alphabetic displays. The materials utilized in FIG. 3 may be similar to those that have been previously described. During operation of the device shown in FIG. 3, with the vertical sawtooth applied to the conductor 36, wires 39 are selected to be energized depending upon the bias applied by the bias distributor 40 and the height of the sawtooth wave as has previously been described. At the same time, selected ones of the vertically extending wires 49 are energized, depending upon bias from the bias distributor 52 and the height of the sawtooth wave form. Thus, by proper coordination between the sawtooth voltages and bias voltages, a spot of light may be moved down a horizontal line, etc., to provide frame scanning such as flying spot scanner. When the vertical and horizontal sawtooth waves are modulated with signal information, from the sources 42 and 50, the moving light spot is modulated and produces a visible image.

Figures 4, 5:
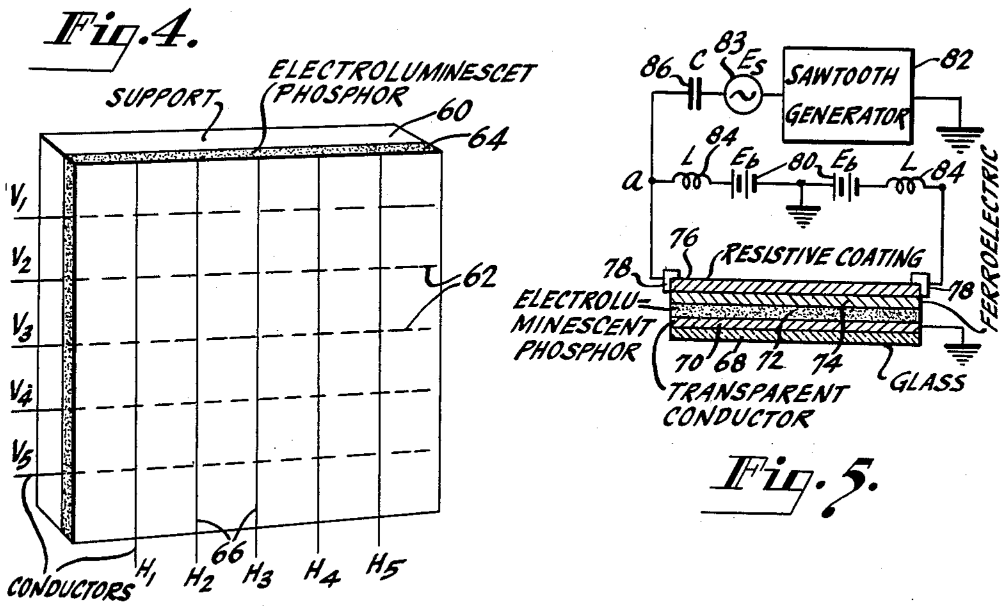
FIG. 4 is a perspective view of a conventional electroluminescent panel having a cross grid array of electrodes.
FIG. 5 is a sectional view of an embodiment of this invention showing a single line of a device wherein the scanning and display means are combined in one structure; and, FIG. 6 is a perspective view of another embodiment of this invention.

Referring now to FIG. 4 there is shown an embodiment of an electroluminescent display panel of the cross grid array type wherein a transparent support member 60 supports a plurality of horizontally extending wires 62. On the wires 62 there is provided an electroluminescent layer 64, which in turn is covered by a plurality of vertically extending wires 66. When the voltage is applied between a selected horizontal wire 62 and a selected vertical wire 66, the phosphor area at the cross-over point of the two selected wires will light up. Due to the relatively high non-linearity of the electroluminescent phosphor output with voltage, only the area sandwiched between the two intersecting conductors will produce light.

By connecting the scanning system, shown in FIG. 3, to the horizontal and vertical wires shown in FIG. 4, an image may be reproduced on a display device that is rather simple to manufacture. In other words, electrodes 38 and 50 of the vertical and horizontal scanning systems, of FIG. 3 are connected to wires 62 and 66 respectively of FIG. 4. Thus, once the ferro-electric members 34 and 46 have been connected to the horizontal and vertical wires of the cross grid array, scanning may be produced with only one lead-in for each of the plurality of the cross grid array of wires.

Referring now to FIG. 5, there is shown a sectional view of a single line of scanning of an embodiment of this invention. It should be understood that a plurality of single line scanning device may be utilized to produce a frame scanning system. In this embodiment, a strip of glass, or other transparent support, 68 is covered with a transparent conductor 70. On the transparent conductor 70 there is provided a layer of electroluminescent material 72. On the layer of electroluminescent material there is provided a layer of ferro-electric material 74. On the layer of ferro-electric material 74 there is provided a resistive coating 76. Connected to each of the opposite ends of the resistive coating is a different conductor 78. The materials used in the embodiment shown in FIG. 5 may be similar to those previously described while a material such as carbon black may be used for the resistive coating 76. The resistive coating 76 should provide a potential distribution on the ferro-electric surface. The voltage per elemental area required is proportional to the thickness of the corresponding ferro-electric material. For a thickness of .01 inch, about 5 volts per elemental area was used.

With the transparent conductor 70 connected to ground, and a distributed bias provided between the two conductors 78, by means of batteries 80 and the resistive coating 76, a sawtooth potential applied by means of a generator 82 provides a scanning of the line illustrated. The signal is modulated by a source 83 which produces an image of a scanning line. In the bias producing circuit, there is provided a pair of coils 84 which are for the purpose of preventing the sawtooth wave, and the signal voltage, from shorting to ground. Due to the presence of a capacitor 86, the D.C. bias from the source 83 is isolated from ground. Thus, the bias distributor circuit, and the scanning circuit, do not interfere functionally.

With the bias applied between the two conductors 78, and the transparent conductor 70 connected to ground, the sawtooth potential is effectively scanned across the ferro-electric layer 74 and the electroluminescent material 72 produces light in the selected areas. This light will include the signal voltage as has previously been described. As the ferro-electric capacitor is switched by the sawtooth voltage, the A.C. signal voltage appearing across the electroluminescent layer, scans the length of the single line shown in FIG. 5.

It should be understood that a plurality of the devices shown in FIG. 5 can be utilized, in co-operation with the horizontal scanning unit shown in FIG. 3, and an image reproducer provided. Also, the single line scanning unit shown in FIG. 5 may be used with other horizontal scanning devices.

Figure 6:
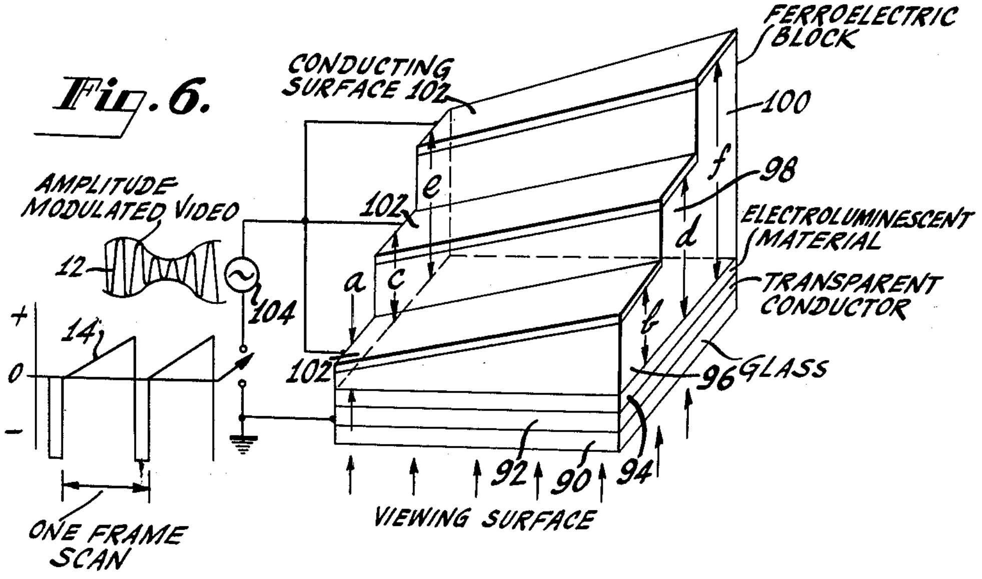

Referring now to FIG. 6 there is shown an embodiment of this invention comprising a transparent support 90 having a transparent conductor 92 on one surface thereof. On the transparent conductor 92, there is provided a layer of electroluminescent material 94. On the layer of electroluminescent material 94 there are provided a plurality of ferro-electric wedge shaped members 96, 98 and 100. Due to the fact that the fero-electric elements 96, 98 and 100 are wedge shaped, the elements near *a* are the first to switch and conduct. As the sawtooth pulse continues to rise, the *a* elements cease conducting and the critical height of the sawtooth pulse is applied to the elements to the right of *a*. Further increase in the height of the sawtooth voltage switches elements *c*. In other words, the thickness of the ferro-electric member in co-operation with the height of the sawtooth pulse, determines the area of the ferro-electric member which is of low impedance at that instant. Due to the fact that the ferro-electric elements are thicker from one line to the next, the sawtooth voltage will scan from one line to the next line as the magnitude of the sawtooth pulse is increased. For example, a portion of the sawtooth voltage will scan the ferro-electric wedge layer 96 while a larger portion scans the ferro-electric wedge 98.

In order to prevent breakdown, the minimium thickness of the ferro-electric wedge should be sufficiently great so that the breakdown strength is not exceeded by the maximum applied peak voltage. On each of the ferro-electric wedge shaped members there is a separate conductor 102 which is connected to a signal source 104 and a source of sawtooth potential. The transparent conductor 92 is connected to ground.

The critical voltage at which each portion of the ferro-electric wedges 96, 98 and 100 can be switched, is directly proportional to the height of the ferro-electric block and the height or magnitude of the sawtooth pulse. Thus, if the block 96 is initially in a non-conducting state, and the sawtooth voltage pulse keeps going positive, the blocks 96, 98 and 100 become sequentially conducting. The video signal that is provided by the source 104 excites the electroluminescent material in the limited vicinity of the switching and the electroluminescent material 94 lights in the selected area, with an intensity that is proportional to the amplitude provided by the source 104. Consequently, if the switching of the ferro-electric blocks proceeds, the video signal is displayed.

It should be understood that, in all of the embodiments of this invention, the electroluminescent phosphor may be in the form of a display panel for displaying a complete image or may be in the form of a random access device for a display such as a numeric or alphabetic display. Thus, applicant's invention has provided a novel scanning device for a solid state image producing means which is simple to construct, in that many of the components may be made by known printed circuit techniques, small in size, and is easily operated.

What is claimed is:

1. An electroluminescent display device comprising an electroluminescent phosphor, a ferro-electric member electrically coupled to said phosphor, and means for providing a distributed bias across said ferro-electric member.

2. An electroluminescent device comprising an electroluminescent phosphor, means for applying potentials to said phosphor, said means comprising a ferro-electric means, and means for producing a distributed bias across said ferro-electric means.

3. A display device comprising an electroluminescent phosphor, means for applying signal voltages to said phosphor, said means including an elongated ferro-electric member, said means further including a means for producing a bias across said ferro-electric member which varies from one end of said ferro-electric member to the other end of said ferro-electric member.

4. A display device comprising an electroluminescent phosphor, a conductor in contact with one side of said phosphor, a ferro-electric member in contact with the other side of said phosphor, and means for producing a distributed bias on said ferro-electric member.

5. An electroluminescent display system comprising an electroluminescent phosphor, a first plurality of spaced apart electrical conductors extending across one surface of said electroluminescent phosphor and in one direction, a second plurality of spaced apart electrical conductors extending across another surface of said electroluminescent phosphor and in an opposite direction, means for applying voltages to selected ones of said first and said second plurality of electrical conductors, said means including at least one ferro-electric member and means for applying a sawtooth voltage wave form to said ferro-electric member.

6. An electroluminescent display system comprising a transparent electrode, an electroluminescent phosphor on said electrode, a ferro-electric member on said phosphor, said ferro-electric member being wedge shaped, and an electrode on said ferro-electric member.

7. A display system comprising an electroluminescent phosphor adapted to have a potential applied thereacross, scanning means electrically connected to said phosphor, said scanning means including a body of ferro-electric material and means for applying a distributed bias across said ferro-electric material.

8. A display system as in claim 7 wherein said last named means includes a resistive layer on said ferro-electric material.

9. A display system as in claim 7 wherein said last named means includes a plurality of potentials each electrically connected to different areas of said ferro-electric material.

10. A display system comprising an electroluminescent phosphor display panel of the cross-grid array type, scanning means for energizing selected ones of the horizontal and vertical wires of said panel, said scanning means comprising an elongated ferro-electric member and means for providing a bias that varies from one end of said ferro-electric member to the other.

11. A scanning system for use with an electroluminescent display device comprising a source of sawtooth voltage, a signal source connected to said sawtooth voltage source, a ferro-electric member connected to said signal source, and means for applying a bias voltage to said ferro-electric member that differs from area to area across said ferro-electric member.

12. An electroluminescent display device comprising a plurality of areas of electroluminescent phosphor, means for applying a potential across selected ones of said areas, said means including a ferro-electric member, at least one source of sawtooth voltages connected to said ferro-electric member, and a means for applying a bias to said ferro-electric member that varies across said ferro-electric member.

13. An image display device comprising an electroluminescent phosphor means having a plurality of areas of display, means for applying an exciting voltage to selected ones of said areas of display, said means including at least one ferro-electric body, and said ferro-electric body being adapted to have a bias applied thereto that varies from point to point across said ferro-electric body.

14. An image display device as in claim 13 wherein each of said areas of display of said electroluminescent phosphor means are spaced from adjacent ones of said areas of display.

15. An image device as in claim 13 wherein said bias is applied by means of a resistive coating on said ferro-electric body.

16. An image display device as in claim 13 wherein said bias is applied by means including at least one wedge shaped ferro-electric body.

References Cited in the file of this patent

UNITED STATES PATENTS

| | | |
|---|---|---|
| 2,755,457 | Diemer et al. | July 17, 1956 |
| 2,875,380 | Toulon | Feb. 24, 1959 |
| 2,877,371 | Orthuber et al. | Mar. 10, 1959 |
| 2,880,346 | Nicoll et al. | Mar. 31, 1959 |
| 2,886,731 | Zappacosta | May 12, 1959 |
| 2,917,667 | Sack | Dec. 15, 1959 |
| 2,942,131 | Diemer et al. | June 21, 1960 |

FOREIGN PATENTS

| | | |
|---|---|---|
| 1,117,682 | France | Feb. 27, 1956 |